(12) United States Patent
Wilson

(10) Patent No.: US 7,103,024 B2
(45) Date of Patent: Sep. 5, 2006

(54) WIRELESS LOCAL AREA NETWORK FUTURE SERVICE QUALITY DETERMINATION METHOD

(75) Inventor: Timothy J. Wilson, Rolling Meadows, IL (US)

(73) Assignee: Motorola, Inc., Schaumburg, IL (US)

( * ) Notice: Subject to any disclaimer, the term of this patent is extended or adjusted under 35 U.S.C. 154(b) by 60 days.

(21) Appl. No.: 10/688,377

(22) Filed: Oct. 17, 2003

(65) Prior Publication Data

US 2005/0083840 A1    Apr. 21, 2005

(51) Int. Cl.
*H04Q 7/00* (2006.01)

(52) U.S. Cl. .................. 370/332; 370/341; 455/67.11; 455/423; 455/436; 455/439

(58) Field of Classification Search ................. 370/331, 370/338, 252, 401, 329, 332, 333, 341; 455/436–444, 455/423, 425, 453, 67.11
See application file for complete search history.

(56) References Cited

U.S. PATENT DOCUMENTS

| | | | |
|---|---|---|---|
| 6,243,581 B1* | 6/2001 | Jawanda | 455/432.2 |
| 6,408,184 B1* | 6/2002 | Kallio et al. | 455/445 |
| 2002/0147008 A1* | 10/2002 | Kallio | 455/426 |
| 2004/0087307 A1* | 5/2004 | Ibe et al. | 455/436 |
| 2004/0097230 A1* | 5/2004 | Natarajan et al. | 455/436 |
| 2005/0053034 A1* | 3/2005 | Chiueh | 370/331 |
| 2005/0059400 A1* | 3/2005 | Jagadeesan et al. | 455/436 |
| 2005/0096045 A1* | 5/2005 | Palmer et al. | 455/423 |

\* cited by examiner

*Primary Examiner*—John Pezzlo
*Assistant Examiner*—Inder Pal Mehra

(57) ABSTRACT

A communication method can inform a WLAN-to-WAN handoff process as a function, at least in part, of a determined likely future quality of service (35). In particular, a comparison (36) can be made as between the likely future quality of service being afforded by the WLAN and one or more threshold values that represent acceptable levels of service. In one embodiment projected likely quality of service values as correspond to different future points in time can be used to more completely inform the evaluation process.

29 Claims, 3 Drawing Sheets

WIRELESS LOCAL AREA NETWORK FUTURE SERVICE QUALITY DETERMINATION METHOD

TECHNICAL FIELD

This invention relates generally to wireless local area networks (WLAN's) and more particularly to service quality determination as pertains thereto.

BACKGROUND

WLAN's of various kinds are known in the art including, but not limited to, 802.11 compatible systems (such as 802.11(a), 802.11(b), 802.11(g) and so forth). Such systems allow a portable computing device to be used at various locations within the coverage area of the WVLAN in a fairly transparent manner with respect to the user's perception regarding connectivity. For example, although a given WLAN may be comprised of a plurality of access points (AP's), the user will often have no particular sense of which AP is presently supporting their mobile unit's communications needs.

Such WLAN's are capable of supporting a wide variety of communication needs including but not limited to voice communications (such as so-called Voice-over-Internet-Protocol (VoIP) communication services). When available, such voice services can be very desirable as often such services, including even long distance telephony, can be accomplished with essentially little or no incremental additional cost to the user. Notwithstanding such benefits, however, there are some impediments to widespread application and use of such services. For example, the user must have a handset (or other platform) that will support such services. This requirement can be troubling to some users who wish to only have and utilize a single communication platform. Such users will typically eschew use of a separate device that offers the benefits of WLAN connectivity in favor of a single wide area network (WAN) device such as a cellular telephone that will offer essentially ubiquitous coverage.

To meet the requirements of such users, it has been proposed that a single portable device can be configured as both a WAN device and a WLAN device such that a single device can support and facilitate voice communications (or other desired communications) in both a WAN operating environment and in a WLAN operating environment when available. Unfortunately, a simplistic combination of two such capabilities in a single housing, while quite attainable, does not address all of the user's needs. As one important example, without further integration between such operability, the user can experience a dropped communication when they begin a communication using the WLAN capability of the device but, during the course of that communication, leave the coverage area of the WLAN.

One proposed solution is to facilitate a handoff of the on-going communication from the WLAN to the WAN during the course of such a communication. While such a capability would appear to address this particular need, implementation of such a capability poses numerous challenges. In particular, present system dynamics mitigate strongly in many operating scenarios against being able to actually effect a handoff during the course of the communication. For example, while it can consume many seconds (such as more than ten seconds) to complete the entire process of acquiring a WAN link and switching the WLAN communication over to the WAN link, the user can leave the effective coverage area of the WLAN in considerably less time. As a result, the time that intervenes between when the device or system can ascertain that a handoff is required and when the device is unsupported by the WLAN is often considerably less than what is required to ensure a handoff of a presently on-going communication. Instead, the WLAN link will be lost and dropped prior to when the WAN link can be brought up and rendered able to accept the WLAN-supported communication.

BRIEF DESCRIPTION OF THE DRAWINGS

The above needs are at least partially met through provision of the wireless local area network future service quality determination method described in the following detailed description, particularly when studied in conjunction with the drawings, wherein.

Figure 1:
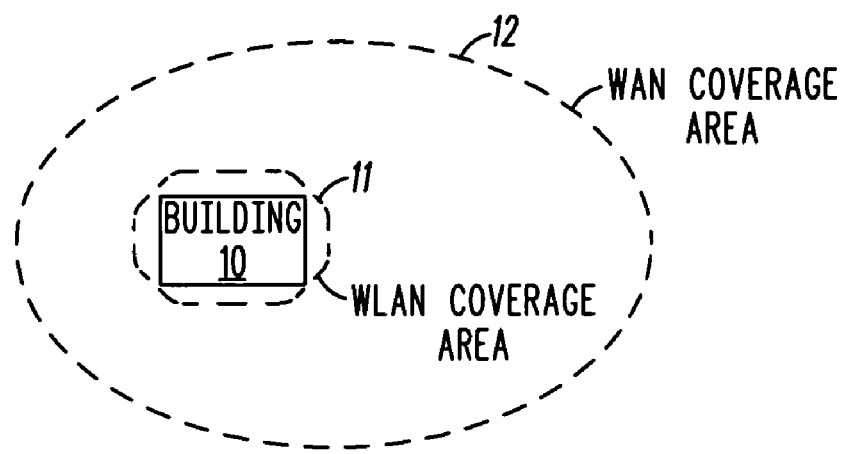
FIG. 1 comprises a prior art top plan schematic view of a WLAN that overlaps with a WAN.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, quality of service for one or more wireless communication links of a WLAN (between a mobile user and corresponding access points) are determined and then used to facilitate determination of a likelihood that the quality of service as offered by the WLAN will have at least a predetermined relationship with respect to at least one threshold value at a predetermined future time.

Pursuant to one embodiment, one or more present (or near term) values for quality of service are determined for one or more access point links. Those values are then used, alone or in conjunction with earlier measured or calculated quality of service values, to estimate a projected quality of service at a predetermined future time. The latter value can comprise, depending upon the embodiment, a best quality of service value amongst a plurality of calculated quality of service values for corresponding access points, a value comprising a corresponding probability that acceptable quality of service will be available at the future time, and so forth as best meets the needs of a given setting and application.

Such projections can be determined in a variety of ways. For example, such extrapolations can include a least square line fit process that utilizes present and previous measurements and calculations to project a likely future quality of service value.

Pursuant to one preferred approach, when the future quality of service at the predetermined future time appears to be insufficient to support a WLAN communication at that time, a closer-in future time can be examined to determine whether the future quality of service at that closer-in future time will at least likely be adequate to support the WLAN communication. Such information can then be used to support a handoff process that has differing elements of urgency. For example, when present service appears to be fading to a level sufficiently diminished that a handoff should be initiated with an ordinary level of urgency, such a measured response can be initiated with some degree of confidence that such an action will be adequate to the cause. On the other hand, when present service appears to be fading at a more rapid pace of degradation, that information can be used to facilitate a more expedited handoff mechanism and process.

So configured, such processes permit a handoff point to be projected and estimated with sufficient lead time to permit an orderly and effective handoff from a WLAN to a WAN without likely permitting a dropped communication as the device and user leave the coverage area of the WLAN. This, in turn, can enable a more user-friendly operating paradigm that better suits the communication needs and behaviors of numerous users even when using a more universal device that supports communications via both a WAN and a WLAN.

Referring now to FIG. 1, a WLAN system (such as an 802.11(b) system) will often be deployed to provide coverage in a relatively well-defined area such as a building 10. Often, of course, the coverage area 11 provided by the WLAN will extend beyond the exact confines of such a building 10 but will, in general, typically extend no more than a relatively short distance there beyond. In a typical setting, such a building 10 and WLAN coverage area 11 will also be at least partially coextensive with an overlapping WAN coverage area 12 (as provided, for example, by a cellular telephone system). Such conditions are sufficient to permit a suitably configured communications device located within the building 10 to communicate to another party using either the WLAN system or the WAN system. All other things being equal, the WLAN system might be preferred due to the likely reduced costs of using that system. As will be shown herein, by implementing one or more of these disclosed teachings the user can initiate such a communication by using the WLAN system and can continue that communication via a timely handoff to the WAN system as informed by a heightened sense of when such a handoff should be prepared and/or actuated.

Figure 2:
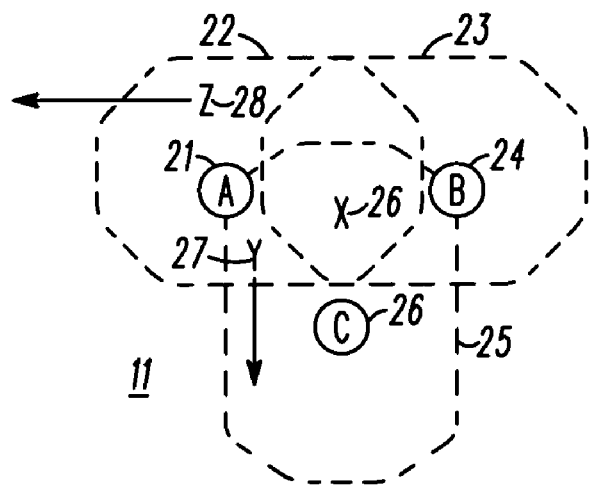
FIG. 2 comprises a prior art top plan schematic view of a WLAN having three access points.

With reference to FIG. 2, in many instances the coverage area 11 of the WLAN will itself be the result of an aggregation of a plurality of smaller WLAN coverage zones. For example, as depicted for illustrative purposes, a given WLAN can comprise three access points 21, 24, and 26 wherein each such access point has a corresponding effective coverage zone 22, 23, and 25 respectively (it will be understood that a given WLAN can in fact be comprised of virtually any number of access points). Often, at least some of these coverage zones overlap with one another. For example, a device located at position X 26 is within the operative reach of all three coverage zones 22, 23, and 25. During ordinary use, as a given device moves with its user through (or out of) the aggregate coverage area 11, the device will move out of and into the coverage ambit of various of the access points. For example, a device Y 27 may begin in an area that is within two coverage zones 22 and 25, but when moving in the direction indicated will move outside the range that corresponds to access point A 21 until it can only be serviced by access point C 26. Similarly, a device Z 28 that moves in the direction indicated will move from an area that is serviced by access point A 21 to an area that is outside of the WLAN coverage area 11 in its entirety.

Pursuant to the embodiments set forth herein, quality of service measurements as correspond to various available (or permitted) links with various such access points are used to assess, essentially, whether the corresponding device is moving in a fashion that will likely remove the device from the aggregate coverage area 11 of the WLAN in sufficient time to permit a handoff to be made to a WAN that provides coverage external to the WLAN without dropping or unduly interrupting the communication in progress. In general, these processes are preferably effected via the portable communication device itself. Many such devices include a programmable control unit(s) that can be suitably programmed in accordance with well understood prior art technique and methodology to realize the process(es) set forth herein and/or the selected process can be provided through use of a dedicated purpose platform (again in accord with well-understood prior art technique). It should also be understood that these teachings are generally applicable with various handoff methodologies, including both those that are presently known and those that are hereafter developed. Therefore, no extended description will be provided here of any particular handoff protocol or process to preserve clarity of description and focus with respect to these embodiments.

Figure 3:
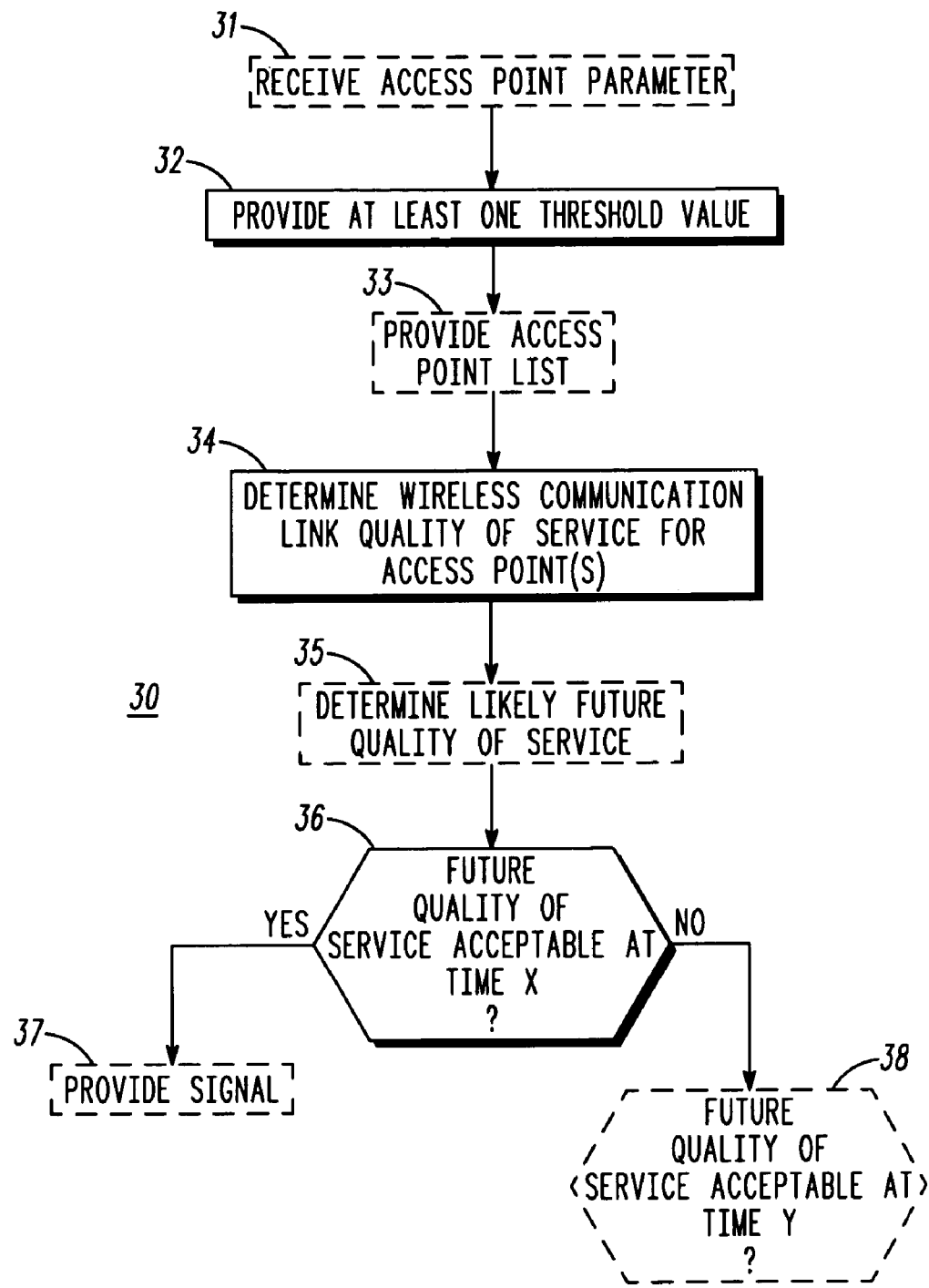
FIG. 3 comprises a flow diagram as configured in accordance with various embodiments of the invention.

Referring now to FIG. 3, a preferred process 30 can optionally include receiving 31 (or otherwise accessing or retrieving) one or more parameters to use when subsequently determining a likelihood that quality of service for a given communication will remain at or above a minimal acceptable level. For example, such a parameter could comprise a weighting factor to be applied against some other variable or constant to thereby bias the calculations of the process towards a particular intended direction (such as more likely causing the process to favor a mode of heightened readiness to effect a near-term handoff notwithstanding what would otherwise appear to be a fully satisfactory link quality of service condition). Such a parameter could be retrieved or obtained in a variety of ways to suit the needs of a given application. For example, the communication device itself could retain such parameters in a look-up table and retrieve them as needed and in correlation to given detected conditions (such as links to a particular access point). As another example, an access point itself could transmit such a parameter or parameters to be used when processing the wireless link that corresponds to that access point or, for example, to a neighboring access point.

This process 30 then provides 32 for at least one threshold value to be used when subsequently evaluating the quality of service values as are generated by the process. Again, the nature and provision of this threshold value can vary to suit the needs of a given context. For example, a single threshold value can apply everywhere within a given LAN and can be internally accessible to the communication device. As another example, one or more of the access points can transmit a particular threshold value to be used when considering their respective quality of service (such an approach might permit, for example, greater flexibility to meet the needs of potentially unique coverage patterns).

Pursuant to one embodiment, the process 30 can also optionally provide 33 a list that identifies at least one access point. As will be shown below, such a list, when provided, can be used to steer, influence, or control the activities of a given communication device with respect to which wireless communication links are monitored and/or how such monitoring occurs in a given instance.

One then determines 34 a quality of service for at least one wireless communication link with at least one access point that comprises a part of a WLAN. For example, pursuant to one approach, the communication unit can measure received signal strength as corresponds to such a link. Pursuant to another approach, the communication unit can determine a link margin value for each such monitored link (wherein the link margin value corresponds in general to the received signal strength value and more particularly, in a preferred approach equals received signal strength less a value that represents interference plus noise).

In a preferred embodiment, such a communication unit will determine such a quality of service value for each received access point. When, however, the communication unit has been provided with an access point list as noted earlier, such a list can be used to inform the monitoring process such that some access points will be essentially ignored or at least reduced in significance.

Figure 4:
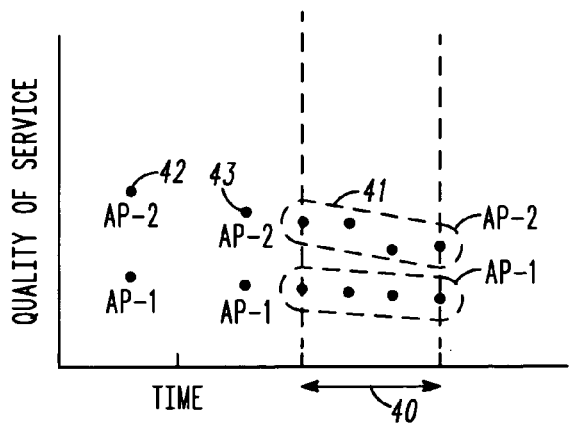
FIG. 4 comprises an illustrative graph as configured in accordance with an embodiment of the invention.

Also in a preferred embodiment, the communication unit will not develop such a quality of service value as based upon a single sampling. Instead, and referring momentarily to FIG. 4, the communication unit will measure the desired parameter a number of times over a given sampling window 40 to thereby develop a plurality of measured values 41 for each access point/link. For example, in the illustration provided, the communication unit detects and monitors two access points AP-1 and AP-2 and takes a quality of service measurement at four discrete moments for each such access point during the sampling window 40. (It will be understood that the duration of the sampling window and the number of measurements taken can and should vary with the needs of a given particular application.)

Referring again to FIG. 3, the process 30 then promotes use of the quality of service values to determine 35 a likelihood that the quality of service as provided to the communication unit will have at least a predetermined relationship with respect to the at least one threshold value at a predetermined future time. For example, the threshold value can represent a minimal effective quality of service level and the process 30 can therefore ascertain whether a projected quality of service value will at least equal or exceed the threshold value.

There are various ways to realize such a projection of a future quality of service value. Pursuant to at least one embodiment, and referring again to FIG. 4, the present measured quality of service values 41 (as independent data points or as some composite representation of choice such as a weighted or unweighted average or median) can be considered together with earlier quality of service values (with only two such earlier determined values 42 and 43 being depicted for the sake of clarity in this illustration) to facilitate estimating a projected quality of service at the predetermined future time. For example, such data points can be used to extrapolate the projected quality of service value.

Figure 5:
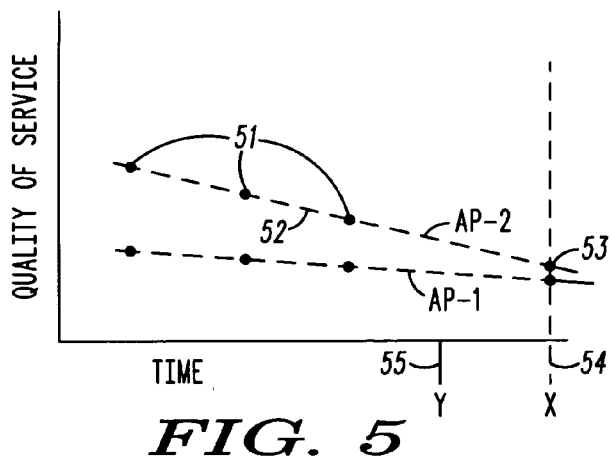
FIG. 5 comprises an illustrative graph as configured in accordance with an embodiment of the invention.

As one specific example, and referring now to FIG. 5, a least square line fit calculation can be used to achieve such an extrapolation. The previous and present data points (or their effective composite representatives) 51 can be processed in this way to achieve a resultant line 52 that projects forward into future time. The projected quality of service value 53 as corresponds to a given predetermined time of interest X 54 can then be gleaned and used as described herein. It will be noted that, for some embodiments, such a line slope can be calculated for each received access point (with two such lines being depicted to illustrate this point). Pursuant to one approach, the process can then select whichever of the projected quality of service values appears to offer the highest quality of service as the value to be used when determining whether future services are likely to be adequate to support the communications of the communication unit.

As a modification of this approach, and pursuant to a modified approach, the process can utilize statistical evaluation to determine an amount by which to reduce the projected quality of service value to thereby perhaps better reflect the likely statistical variations that apply to a given calculated and projected result. For example, a given projected likely quality of service value might be reasonably subject to a relatively wide range of variation with respect to its accuracy due to considerable variations of the source data from the norm as represented by the projection itself As one approach to seeking to ameliorate the potential impact of such variations, the process can simply then reduce the projected quality of service value by an amount that corresponds in some fashion to the amount of likely statistically evident potential variation (i.e., the greater the range of potential variation, the greater the corresponding reduction of the calculated value). The process can then use the reduced projected likely value as otherwise taught herein.

Figure 6:
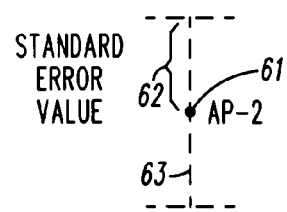
FIG. 6 comprises an illustrative detail of a graph as configured in accordance with an embodiment of the invention.

Pursuant to another more preferred approach, the process can seek to determine a probability that the quality of service as offered by the various access points will have at least a predetermined relationship with respect to the at least one threshold value at the predetermined future time. For example, and referring to FIG. 6, the measured and previously determined quality of service values can be processed statistically to determine a projected probability that a given level 61 of quality of service will exist at the predetermined future time 63. Such a statistical evaluation can include, for example, an assessment of the standard error value 62 as may correspond to the calculated projected value. Such a standard error value 62 can be used to determine a probability that the projected quality of service 61 will have the desired relationship with respect to the threshold value (or values) at the predetermined future time 63.

Referring again to FIG. 3, the process 30 assesses 36 the projected future likely quality of service value or values to determine whether the likely level of support will be acceptable at the predetermined future time X. Depending upon the embodiment, this assessment can comprise one or more of:

comparing a directly extrapolated quality of service value against the threshold value that represents the acceptable level of quality of service at that future time;

comparing a statistically modified/reduced extrapolated quality of service value against such a threshold value; and/or comparing a value representing a statistical probability that the quality of service at the future time of interest will at least equal or exceed the threshold value that correlates to an acceptable probability of such a result.

In a preferred embodiment, the predetermined future time of interest is approximately ten seconds. It may be desirable to select this predetermined future time of interest to ensure that a complete handoff can be facilitated within that intervening time frame if necessary. For example, if it will usually take around twelve seconds to acquire a WAN link and then shift the current WLAN communication to the acquired WAN link, then the predetermined future time of interest can comprise a point of time that is twelve seconds in the future from when the quality of service samples are acquired.

When the likely future quality of service appears to be acceptable, the process 30 can then take a corresponding appropriate action. This may, in fact, comprise taking no particular action at all other than to continue cycling through the process 30 to continually evaluate the likely future trend of a given communication. Or, if desired, an appropriate signal (or signals) can be provided 37 to effect some useful supplemental action. For example, it may be useful to update a data file to reflect the present state of the call.

When the likely future quality of service appears to be unacceptable, the process 30 can of course take an appropriate action in that instance as well. For example, pursuant to one approach, the process can provide a signal indicating the apparent cessation of service capability at the projected time such that the device can effect a handoff of the present communication from the WLAN to the WAN.

It is also possible, of course, that the present prediction will not, in fact, come to pass. That is, for whatever reason, the quality of service may not drop as predicted to an unacceptable level and it may not be necessary to effect such a handoff. As an alternative approach to at least partially address such a circumstance, the communication device can be programmed to begin the handoff process upon receiving such an indication from the process 30 but to not complete the handoff process without additional input from the process 30. Pursuant to this approach, the process 30 can optionally make an additional determination 38 as to whether the quality of service will at least likely be acceptable at an earlier point in time Y (as depicted illustratively by reference numeral 55 in FIG. 5). For example, when the first point in time is twelve seconds, it may be useful to select a closer in point of time of four seconds. Such an assessment can make use of the same data and extrapolations and/or statistical analysis as served before to project a quality of service likelihood for the twelve second point in time.

So configured, when it appears that the quality of service will also not likely be acceptable at the second closer-in point in time, an additional signal can be provided by the process 30 to the communication device to this effect. So informed, the latter can then proceed to either fully effect a handoff and/or, less preferably, to otherwise prepare for a discontinuity in the present communication. When the quality of service at the second closer-in point in time appears, however, to likely be acceptable, it may be adequate to maintain the communication device in a ready-to-handoff mode rather than to actually effect the completion of the handoff. For example, the communication device can have taken steps towards acquiring the WAN link, but can postpone actually switching the communication to that WAN link unless and until the projected likely quality of service at the closer-in time appears inadequate.

The above teachings will support a wide variety of applications. For example, so configured, a communication device that is compatible with both a WLAN and a WAN can facilitate its own handoff protocols by monitoring the wireless communication paths as correspond to at least some of the access points of the WLAN and determine a plurality of measured quality of service metrics over a sampling period for each of at least some of the monitored paths. Then, for at least some of the monitored paths, the device can use the plurality of measured quality of service metrics to extrapolate likely future quality of service values and use those values to determine a probability that at least one of the monitored wireless communication paths will continue to provide viable wireless communication service. That probability can then be used to determine whether the communication device is likely to soon require a handoff of a present communication from the WLAN to the WAN.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

For example, in the illustrative embodiments provided above, the process makes predictions with respect to one or two future points in time. It would of course be possible to make predictions for other points in time as well and to use such additional predictions to inform additional decision points or steps. For example, while it may be evident that a given communication will experience a drop in quality of service at a given point in time (as the communication device moves distant from a then-closest access point), it may also be evident that another link as corresponds to another access point is experiencing an increasing quality of service (as the communication device also moves closer to this second access point) such that, at a short time following the low quality of service as is predicted for a first point in time, an acceptable level of quality may be expected at a near-term subsequent second point in time. By permitting the communication device to experience a brief and transient diminution of service below an ordinarily acceptable level of quality of service without effecting a handoff, the communication device can continue to maintain the communication within the WLAN with a concurrent overall acceptable level of quality of service.

As another example, it should be evident that, when a communication first begins, there will be little or no data upon which to base a useful extrapolation. It may therefore be helpful to provide a weighting mechanism, a delay mechanism, or to employ hysteresis to prevent the lack of such data from being incorrectly interpreted as indicative of an impending dropped communication.

I claim:

1. A method comprising:
   providing at least one threshold value;
   determining quality of service values for wireless communication links with a plurality of access points that comprise of a wireless local area network;
   determining a likelihood that the quality of service values for the wireless communication links with the plurality of access points will have at least a predetermined relationship with respect to the at least one threshold value at a predetermined future time; and
   using the likelihood to determine whether to switch communications from the wireless local area network to a different network.

2. The method of claim 1 wherein determining quality of service values for wireless communication links with plurality of access points that comprise a part of a wireless local area network comprises determining the plurality of quality of service values for the wireless communication links with the access points over a sampling period of time.

3. The method of claim 2 wherein determining a likelihood that the quality of service values for the wireless communication links with the plurality of access points will have at least a predetermined relationship with respect to the at least one threshold value at a predetermined future time comprises using the plurality of quality of service values to estimate a projected quality of service at the predetermined future time.

4. The method of claim 3 wherein determining a likelihood that the quality of service values for the wireless communication links with the plurality of access points will have at least a predetermined relationship with respect to the at least one threshold value at a predetermined future time further comprises using the plurality of quality of service values to extrapolate a projected quality of service at the predetermined future time.

5. The method of claim 4 wherein using the plurality of quality of service values to estimate a projected quality of service at the predetermined future time further comprises using a least square line fit process with the plurality of quality of service values to extrapolate the projected quality of service at the predetermined future time.

6. The method of claim 5 wherein using the plurality of quality of service values to estimate a projected quality of service at the predetermined future time further comprises determining a standard error value as corresponds to the projected quality of service.

7. The method of claim 6 wherein determining a likelihood that the quality of service values for the wireless communication links with the plurality of access points will have at least a predetermined relationship with respect to the at least one threshold value at a predetermined future time further comprises using the standard error value to determine a probability that the projected quality of service will have at least the predetermined relationship with respect to the at least one threshold value at the predetermined future time.

8. The method of claim 1 and further comprising providing a first signal when there is at least a predetermined likelihood that the quality of service values for the wireless communication links with the plurality of access points will have at least the predetermined relationship with respect to the at least one threshold value at the predetermined future time.

9. The method of claim 8 and further comprising:
when there is not at least a predetermined likelihood that the quality of service values for the wireless communication links with the plurality of access points will have at least the predetermined relationship with respect to the at least one threshold value at the predetermined future time, determining a likelihood that the quality of service values for the wireless communication links with the plurality of access points will have at least a predetermined relationship with respect to the at least one threshold value at least a second predetermined future time, which second predetermined future time is different than the predetermined future time.

10. The method of claim 9 wherein the second predetermined future time is sooner than the predetermined future time.

11. The method of claim 9 wherein the predetermined future time is approximately 12 seconds in the future and the second predetermined future time is approximately 4 seconds in the future.

12. The method of claim 1 and further comprising:
providing a list that identifies at least one access point;
using the list when determining the likelihood that the quality of service values for the wireless communication links with the plurality of access points will have at least a predetermined relationship with respect to the at least one threshold value at the predetermined future time.

13. The method of claim 12 wherein using the list when determining the likelihood that the quality of service values for the wireless communication links with the plurality of access points will have at least a predetermined relationship with respect to the at least one threshold value at the predetermined future time comprises using the list to identify access points to be considered when determining the likelihood.

14. The method of claim 1 and further comprising receiving at least one parameter from an access point, and wherein determining a likelihood that the quality of service values for the wireless communication links with the plurality of access points will have at least a predetermined relationship with respect to the at least one threshold value at a predetermined future time comprises using at least one parameter when determining the likelihood that the quality of service values for the wireless communication links with the plurality of access points will have at least a predetermined relationship with respect to the at least one threshold value at the predetermined future time.

15. The method of claim 1 wherein determining quality of service values comprises determining received signal strength values as corresponds to the wireless communication links.

16. The method of claim 15 wherein determining quality of service values further comprises determining a link margin value as corresponds to the wireless communication links as a function, at least in part, of the received signal strength values.

17. The method of claim 1 wherein determining a likelihood that the quality of service values for the wireless communication links with the plurality of access points will have at least a predetermined relationship with respect to the at least one threshold value at a predetermined future time comprises determining a probability that the quality of service values for the wireless communication links with the plurality of access points will have at least a predetermined relationship with respect to the at least one threshold value at a predetermined future time.

18. The method of claim 1 wherein:
determining quality of service values for wireless communication links comprises determining quality of service for each of a plurality of wireless communication links that comprise a part of the wireless local area network; and
determining a likelihood that the quality of service values for the wireless communication links with the plurality of access points will have at least a predetermined relationship with respect to the at least one threshold value at a predetermined future time comprises:
estimating a likely future quality of service value for each of the plurality of wireless communication links at a future time;
selecting whichever of the likely future quality of service values represents a best quality of service relative to the other likely future quality of service values to provide a selected future quality of service value;
using the selected future quality of service value to determine the likelihood that the quality of service will have at least a predetermined relationship with respect to the at least one threshold value at the predetermined future time.

19. The method of claim 18 wherein:
estimating a likely future quality of service value for each of the plurality of wireless communication links at a future time further comprises statistically estimating a reduced likely future quality of service value for at least some of the plurality of wireless communication links at a future time as a function, at least in part, of statistics regarding the wireless communication links; and
selecting whichever of the likely future quality of service values represents a best quality of service relative to the other likely future quality of service values to provide a selected future quality of service value further comprises selecting whichever of the reduced likely future quality of service values represents a best quality of service relative to the other reduced likely future quality of service values to provide a selected reduced likely future quality of service value; and
using the selected future quality of service value to determine the likelihood that the quality of service values for the wireless communication links with the plurality of access points will have at least a predetermined relationship with respect to the at least one threshold value at the predetermined future time further comprises using the selected reduced future quality of service value to determine the likelihood that the quality of service will have at least a predetermined relationship with respect to the at least one threshold value at the predetermined future time.

20. A method to facilitate handing off a wireless communication from a wireless local area network to a wireless wide area network, comprising:
monitoring wireless communication paths for at least some access points of the wireless local area network;
determining a plurality of measured quality of service metrics over a sampling period for each of at least some of the monitored wireless communication paths,
for at least some of the monitored wireless communication paths, using the plurality of measured quality of service metrics to extrapolate likely future quality of service values;
using the likely future quality of service values to determine a probability that at least one of the monitored wireless communication paths will continue to provide viable wireless communication service;
using the probability to determine whether a wireless subscriber unit presently supporting a wireless local area network communication is likely to soon require a hand off of that communication to the wireless wide area network.

21. The method of claim 20 wherein monitoring wireless communication paths for at least some access points of the wireless local area network comprises monitoring all wireless communication paths that are received.

22. The method of claim 20 wherein monitoring wireless communication paths for at least some access points of the wireless local area network comprises monitoring only selected wireless communication paths such that receivable wireless communication paths that are not selected are not monitored.

23. The method of claim 22 wherein monitoring only selected wireless communication paths such that receivable wireless communication paths that are not selected are not monitored comprises:

receiving information regarding access points;
using the information regarding access points to identify selected wireless communication paths to monitor.

24. The method of claim 20 wherein using the plurality of measured quality of service metrics to extrapolate likely future quality of service values comprises using a least square line fit calculation.

25. The method of claim 20 wherein using the plurality of measured quality of service metrics to extrapolate likely future quality of service values comprises using the plurality of measured quality of service metrics to extrapolate, for at least one of the wireless communication paths:
a first likely future quality of service value for a first future point in time;
a second likely future quality of service value for a second future point in time that is closer in time than the first future point in time.

26. The method of claim 25 wherein using the likely future quality of service values to determine a probability that at least one of the monitored wireless communication paths will continue to provide viable wireless communication service further comprises using the first and second likely future quality of service values to determine corresponding probabilities that at least one of the monitored wireless communication paths will continue to provide viable wireless communication service at the first future point in time and at the second future point in time.

27. A communication device that communicates with communication in a wireless local area network and a wide area network, comprising:
a receiver that receives wireless signals from the wireless local area network; and
a programmable control unit, wherein the programmable control unit is programmed to:
provide at least one threshold value;
determine quality of service values for wireless communication links with plurality of access points that comprise a part of the wireless local area network;
determine a likelihood that the quality of service values for the wireless communication links with the plurality of access points will have at least a predetermined relationship with respect to the at least one threshold value at a predetermined future time; and
use the likelihood to determine whether to switch communications from the wireless local area network to a different network.

28. The communication device according to claim 27, wherein the programmable control unit is programmed to determine the quality of service values for the wireless communication link by determining the quality of service values for the wireless communication links with the access points over a sampling period of time.

29. The communication device according to claim 28, wherein the programmable control unit is programmed to determine a likelihood that the quality of service values for the wireless communication links with the plurality of access points will have at least a predetermined relationship with respect to the at least one threshold value at a predetermined future time by using the plurality of quality of service values to estimate a projected quality of service at the predetermined future time.

* * * * *